May 7, 1968     P. LEMMERZ     3,381,353
METHOD OF MAKING TIRE RIM
Original Filed Aug. 4, 1965
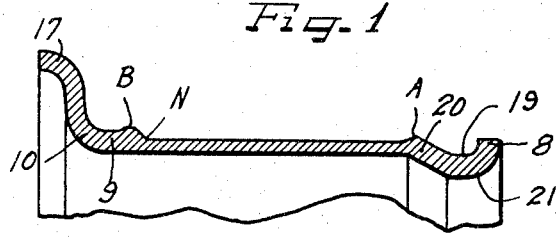
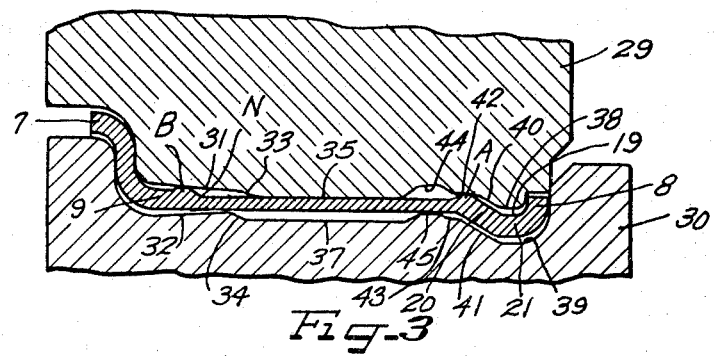
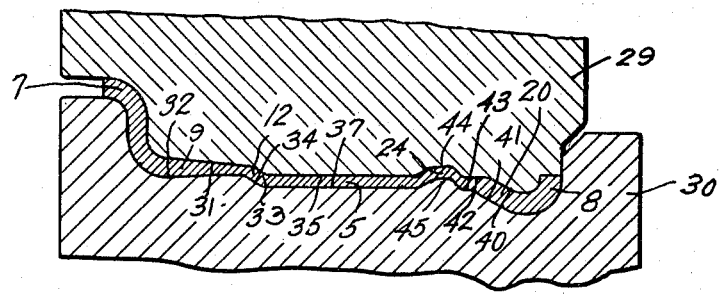
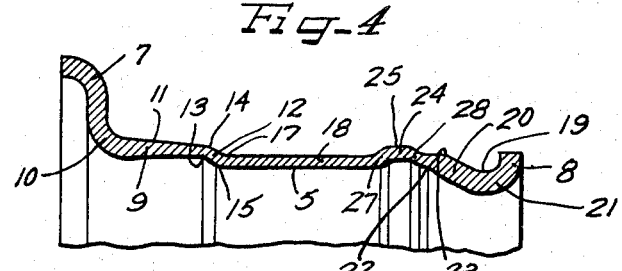
INVENTOR.
*Paul Lemmerz*
BY *Hill, Sherman, Meroni, Gross & Simpson* ATTORNEYS 3,381,353
METHOD OF MAKING TIRE RIM
Paul Lemmerz, Konigswinter (Rhine), Germany, assignor to Lemmerz-Werke G.m.b.H., Konigswinter (Rhine), Germany, a corporation of Germany
Original application Aug. 4, 1965, Ser. No. 477,153, now Patent No. 3,347,302, dated Oct. 17, 1967. Divided and this application Nov. 16, 1966, Ser. No. 607,099
Claims priority, application Germany, Aug. 13, 1964, L 48,537
10 Claims. (Cl. 29—159.1)

ABSTRACT OF THE DISCLOSURE

A method of making tire rims, in which an annular rim blank is provided with side flanges and an intervening body of substantially thinner section with radially outwardly projecting ridges of material at the opposite ends of the body portion, and rolling the ridges of material into respective hardened reinforcing areas between the body portion and the flanges. On one side of the body portion the ridge of material is rolled into a tapered bead seat. At the opposite side of the body portion the ridge is rolled into a tapered lock-ring seat and a radially outwardly projecting annular hollow shoulder rib in the adjacent part of the body portion.

---

This is a division of application Ser. No. 477,153, filed Aug. 4, 1965, now Patent No. 3,347,302 issued Oct. 17, 1967.

This invention relates to improvements in tire rims for automotive vehicles and is more particularly concerned with heavy duty pneumatic tire rims and their manufacture.

Because of the heavy load which must be sustained by the pneumatic tire rims used on such automotive vehicles as trucks, and the like, relatively heavy cross-sectional mass of material must be present in the areas of maximum stress, namely, in and adjacent to the terminal flanges, while the intervening body portion of the rim may be of substantially smaller cross-sectional mass, primarily because it is backed up and reinforced by the wheel disk to which the tire rim is attached.

One way that the desired mass distribution in such tire rims has been attained has been by rolling bar stock or billets into the desired cross-sectional profile and then uniting circularly curved lengths of the thus rolled section by welding the ends to provide the completed tire rim annulus. However, this is a costly technique.

A much more economical method of making these heavy duty tire rims is to form flat bar material such as suitable grade of steel, into a ring by joining, as by welding, the ends of suitable length pieces curved into ring form, and then rolling the rim profile in the thus formed endless ring. To conserve material and avoid scrap losses the initial width and section of the bar stock is calculated to afford the proper amount of material through transverse elongation and redistribution of material. This method of making such tire rims has, however, encountered certain problems, among which may be mentioned attainment of proper distribution of worked material, and the avoidance of points of weakness and the danger of breakage existing at the weak points.

It is, therefore, an important object of the present invention to provide a new and improved method of making heavy duty pneumatic tire rim which entirely avoids any notching effect weaknesses in the structure.

Another object of the invention is to provide a new and improved method of making tire rim of the character described which affords savings in material and weight, while avoiding any structural weaknesses, and can be produced and sold at low cost.

A further object of the invention is to provide a new and improved method of making heavy duty pneumatic tire rim structure having a novel cross-sectional configuration or profile and affording an advantageous distribution of material and reinforcement.

Still another object of the invention is to provide a new and improved method of making heavy duty pneumatic tire rims.

Yet another object of the invention is to provide a new and improved method of making heavy duty pneumatic tire rims according to which advantageous elongation, distribution, working and shaping of the material in the rim section are effected with facility and economically.

Other objects, features and advantages of the present invention will be readily apparent from the following detailed description of a preferred embodiment thereof taken in conjunction with the accompanying drawing, in which:

FIGURE 1 is a fragmentary transverse cross-sectional view through a rolled tire rim showing the same as it appears before it has been subjected to the final rolling step according to the present invention;

FIGURE 2 is a fragmentary transverse cross-sectional view through the same tire rim, inserted between complementary shaping rolls, as at the start of the final rolling operation;

FIGURE 3 is a similar transverse cross-sectional view showing the completion of the rolling operation; and FIGURE 4 is a fragmentary transverse cross-sectional view of the completed tire rim.

On reference to FIGURE 4, a tire rim according to the present invention comprises an annular body 5 of substantial axial width having at one axial side an integral fixed terminal flange 7 and at the opposite axial side a lock-in ring seat flange 8. These flanges are of substantial transverse cross-sectional thickness, such as on the order of twice as thick as the central portion of the rim body 5, and thus of unit mass adequate to withstand safely the considerable strains and stresses that must be accommodated in normal service.

On its fixed terminal flange 7, the body 5 joins the terminal flange 7 through a tapered portion 9 which diminishes gradually in thickness from a transversely rounded juncture 10 of at least as thick a section as the terminal flange itself. Inwardly from the juncture 10 the bead seat portion 9 gradually diminishes in thickness and affords an inwardly sloping oblique tire bead seat 11. At the inner edge of the bead seat 11, the portion 9 joins the remainder of the rim body 5 on an oblique narrow reinforcing offset bend 12 and which avoids any sharp angles by having smoothly rounded radially inner and outer junctures 13 and 14, respectively, with the portion 9 and smoothly rounded radially inner and outer junctures 15 and 17, respectively, with the intermediate annular portion of the rim body 5 which comprises a substantially transversely straight area affording a shallow inset groove 18.

In order to facilitate easy assembly of a tire onto the rim, and to afford ample clearance for reception of the lock-in ring after the tire has been assembled, the tip diameter of the lock-in seat flange 8 is sufficiently less than the diameter of the bead seat 11. Receptive of a split lock-in ring to provide the remaining bead seat, is a radially outwardly opening groove 19 axially inwardly adjacent to the flange 8. This groove is defined at its axially inner side by a radially outwardly and axially inwardly oblique portion 20 which joins the flange 8 on a smoothly rounded juncture 21, with at least the juncture and the adjacent area of the portion 20 of the substantial thickness of the flange 8 for efficient strain and stress resistance.

At its inner boundary, the ring seat portion 20 merges with the body 5 on smoothly rounded radially inner and outer juncture surfaces 22 and 23, respectively. Adjacent to these juncture surfaces, the rim body is provided with a radially outwardly projecting annular hollow shoulder rib 24 having a crown 25 which slopes axially and radially inwardly. The material of this rib is of substantially the same section or thickness as the intermediate portion 18 of the rim body 5 and provides at its axially inner and outer sides respective offsetting juncture bends 27 and 28 which join the body on smoothly rounded radially inner and outer juncture surfaces whereby to afford maximum reinforcing effect and durability.

It will thus be apparent, that the tire rim affords as a result of its profile maximum strength with minimum material and weight. The various annular reinforcing bends and the complete freedom from notching grooves assure freedom from weakness and great durability.

All of the desirable features and advantages enumerated, and others, are attained with the utmost economy by making the tire rim according to the following method from simple wide flat bar or band steel strip having an original gauge thickness substantially the same as the finished thickness of the terminal flange 7 and the lock-in flange 8, and of the minimum band width which will afford the necessary material in the finished tire rim. Pieces of the proper length of such bar or strip material are easily worked and bent into circular ring form and the ends welded together to provide a continuous band. This band is subjected to rolling and working operations resulting in the cross-sectional configuration of FIGURE 1. At this stage the fixed terminal flange 7 is in its substantially finished condition, as is also the lock-in flange 8 at the opposite side. Further, these flanges are, at this stage, at their ultimate axially spaced positions.

Since from the start flanges 7 and 8 remain at substantially the original gauge or thickness of the band material, they are formed by bending working of the marginal portions of the band into the respective flange shapes, resulting in an axial width which is substantially less than the desired ultimate width of the tire rim. Such ultimate width is then attained by rolling the rim bottom or body portion 5 to a reduced thickness and axially elongating the same. In such rolling, the body portion 5 remains in a flat condition with both of its opposite faces substantially parallel.

Since it is desirable to have the side flanges 7 and 8 and the rounded junctures 10 and 21 of the undiminished thickness of the starting band material, it is necessary to confine the rolling of the body 5 to an area which is suitably substantially spaced from the side flanges and the juncture areas adjacent thereto which must desirably remain of a thicker section than the ultimate thickness which will serve the purpose in the body portion 5 itself. Such rolling elongation may be effected either from the fixed terminal flanges side of the partially finished rim or from the lock-in flange side of the partially finished rim.

In the example shown in FIGURE 1, the rolling and elongation of the body portion 5 has been effected from the lock-in flange side toward the fixed terminal flange 7. As a result of such rolling an accumulation A of material appears as a ridge at juncture of the body portion 5 with the oblique flange portion 20. At the opposite side, that is, the side toward which the rolling elongation progressed, a ridge-like accumulation of material B appears. Due to the nature of the rolling action, and the severe reduction in the elongation there results a relatvely sharp line of demarcation or notch N at juncture of the radially outer face of the body portion 5 with the ridge B, leaving a point of weakness. Even though there is not such a pronounced notching effect contiguous to the ridge A, a weakness or potential fracture line is present. A similar delineation as N, resulting in a pronounced and dangerous notching would be present at A, if the rolling elongation of the body 5 were started at the flange 7 side of the rim blank and progressed toward the flange 8 side of the blank.

Elimination of any dangerous notching of the rim body is effected by subjecting the rim blank to a final or finishing rolling operation between complementary shaping rolls 29 and 30. These are profiled to work and reshape the tire rim blank of FIGURE 1 to the finished cross-sectional configuration of FIGURE 4, performing all the final working at both sides of the rim simultaneously. At their respectively opposite sides, the shaping rolls 29 and 30 have complementary profile portions which receive therebetween and maintain the shape of the side flanges 7 and 8 of the tire rim blank.

Adjacent to the fixed terminal flange receiving side, the forming face perimeters of the rolls 29 and 30 have respective opposed complementary contours for reworking the ridge B of material and the contiguous portions of the rim blank into the tapered bead seat portion 9. To this end, the forming roll 29 has an annular shaping surface 31, and the roll 30 has an opposed annular shaping surface 32. These surfaces 31 and 32 are convergently relatively oriented axially inwardly from the adjacent side toward respective angular annular opposed complementary shaping surfaces 33 and 34 which cooperate in shaping the offsetting and reinforcing bend flange 12. Inwardly from the offsetting forming surfaces 33 and 34, the rolls 29 and 30 have, respectively, opposed horizontally flat opposed rim body engaging annular surfaces 35 and 37.

At the opposite sides of the rolls, shaping surfaces are provided for reshaping the ridge A and contiguous material of the blank. To this end, the shaping roll 29 has an annular rib 38 respective in the lock-in groove 19 and the shaping roll 30 has a complementary groove 39 receptive of the curved juncture 21 and portion of the rim blank. On the axially inner side of the forming rib 38 is an oblique forming surface 40 opposing a complementary oblique forming surface 41 on the roll 30 defining the axial inner side of the groove 39. These forming surfaces 40 and 41 are axially inwardly and radially outwardly convergent for shaping the flange portion 20 and join on smoothly rounded junctures respective opposed substantially parallel narrow annular forming surfaces 42 and 43 respectively. At their inner ends, the forming surfaces 42 and 43 merge onto the rounded contours with, respectively, a shaping groove 44 and a complementary shaping rib 45 designed to form the annular rib 24 in the tire rim.

In the operation of the shaping rolls 29 and 30 on the tire rim blank, the ridge of material A is worked axially inwardly between the opposed shaping surfaces 40, 41 and 42, 43. Material displaced from the ridge A and in the tapering of the flange portion 20 provides for the annular rib 24 into which such material is shaped by the opposed shaping groove 44 and rib 45. At the same time, the ridge of material B is displaced and reshaped to provide a tapering elongation of the bead seat portion 9 and the offsetting and reinforcing flange 12, by action of the forming surfaces 31, 32 and 33, 34. As a result of this axially inward working of the material in the ridges A and B of the blank elimination of the dangerous notchings, and particularly the notch N, is effected, entirely smoothly rounded contours are formed in the cross-sectional profile of the tire rim between the side flanges, and effective annular lines of reinforcement are provided. In addition, due to the working of the material from the ridges A and B highly desirable strengthening and hardening of the material in annular areas or zones between the side flanges and the body 5 and more particularly in the bead seat areas thereof is effected for greatly increasing the durability of the tire rim in the portions which although subjected to severe stresses and strains in use may nevertheless now be of minimum thickness, thus saving material and reducing the dead load or weight of the tire rim, and thus of the wheel and vehicle with which associated.

It will be understood that modifications and variations may be effected without departing from the scope of the novel concepts of the present invention.

I claim as my invention:

1. In a method of making tire rims of the character described:
   providing an annular rim blank with side flanges and an intervening body of substantially thinner section with radially outwardly projecting ridges of material at the opposite ends of the body portion,
   and rolling said ridges of material into respective hardened reinforcing areas between said body portion and said flanges.

2. A method of making tire rims as defined in claim 1, in which said rolling working one of said ridges of material comprises shaping a tapered tire bead seat alongside one of said flanges.

3. A method as defined in claim 1 in which said rolling working of one of said ridges comprises shaping a hollow rib in the wheel body adjacent to such ridge and displacing material from the ridge into said rib.

4. A method of making heavy duty tire rims comprising shaping a metal annulus of predetermined thick section into respective side flanges retaining substantially the section of the blank,
   rolling and elongating the body portion of the blank between said flanges into a substantially thinner section and thereby increasing the spacing between the flanges, in such rolling effecting respective ridges of material at the opposite ends of the body with a notch at juncture of the body with at least one of said ridges,
   and rollingly reworking the material of said ridges generally axially inwardly from the respective flanges and forming tapered seat portions joining the body portion with said flanges.

5. A method according to claim 4, including shaping reinforcing bends in said body portion adjacent to juncture with said tapered seat portions and forming all joining surfaces on smoothly rounded durable radii.

6. In a method of making tire rims of the character described:
   providing an annular rim blank with side flanges and an intervening body of substantially thinner section with a radially outwardly projecting ridge of material at an end of the body portion adjacent to a side flange;
   and rolling said ridge of material into an annular hardened reinforcing area between said body portion and said side flange.

7. A method as defined in claim 6, comprising working said reinforcing area along the body portion into a hollow rib projecting radially outwardly.

8. A method as defined in claim 6, comprising working said reinforcing area into a tapered bead seat.

9. A method of making heavy duty tire rims comprising:
   shaping a metal annulus into respective side flanges and an intervening body portion;
   rolling and elongating the body portion of the blank between said flanges into a substantially thinner section and thereby increasing the spacing between the flanges;
   forming a ridge of material at an end of the body portion;
   and rollingly reworking material of said ridge into a tapered seat portion adjacent one of said flanges.

10. A method as defined in claim 9 which comprises reworking material of said ridge into a radially outwardly projecting hollow reinforcing rib in said one end of the body adjacent to said seat portion.

References Cited

UNITED STATES PATENTS

| | | | |
|---|---|---|---|
| 1,695,531 | 12/1928 | Budd | 29—159.1 |
| 1,841,073 | 1/1932 | Wiles | 62—105 |
| 2,152,757 | 4/1939 | Burger | 301—13 |
| 2,159,371 | 5/1939 | Brink | 29—159.1 |

THOMAS H. EAGER, *Primary Examiner.*